US010543534B2

(12) United States Patent
Hadidi et al.

(10) Patent No.: US 10,543,534 B2
(45) Date of Patent: Jan. 28, 2020

(54) APPARATUS AND METHOD FOR THE PRODUCTION OF QUANTUM PARTICLES

(71) Applicant: AMASTAN TECHNOLOGIES LLC, North Andover, MA (US)

(72) Inventors: Kamal Hadidi, Somerville, MA (US); Gregory Wrobel, Boxford, MA (US)

(73) Assignee: AMASTAN TECHNOLOGIES INC., North Andover, MA (US)

( * ) Notice: Subject to any disclaimer, the term of this patent is extended or adjusted under 35 U.S.C. 154(b) by 423 days.

(21) Appl. No.: 15/347,225

(22) Filed: Nov. 9, 2016

(65) Prior Publication Data

US 2018/0126464 A1     May 10, 2018

(51) Int. Cl.
| | |
|---|---|
| B22F 9/14 | (2006.01) |
| B22F 9/08 | (2006.01) |
| B22F 1/00 | (2006.01) |
| B22F 1/02 | (2006.01) |
| B22F 9/16 | (2006.01) |
| C01B 19/00 | (2006.01) |
| C01G 9/03 | (2006.01) |
| C23C 10/08 | (2006.01) |
| B82Y 30/00 | (2011.01) |
| B82Y 40/00 | (2011.01) |

(52) U.S. Cl.
CPC ............ *B22F 9/082* (2013.01); *B22F 1/0003* (2013.01); *B22F 1/02* (2013.01); *B22F 9/16* (2013.01); *C01B 19/007* (2013.01); *C01G 9/03* (2013.01); *C23C 10/08* (2013.01); *B22F 2009/0836* (2013.01); *B22F 2009/0848* (2013.01); *B22F 2301/30* (2013.01); *B22F 2302/45* (2013.01); *B22F 2998/10* (2013.01); *B82Y 30/00* (2013.01); *B82Y 40/00* (2013.01); *C01P 2004/64* (2013.01); *Y10S 977/774* (2013.01); *Y10S 977/896* (2013.01)

(58) Field of Classification Search
None
See application file for complete search history.

(56) References Cited

U.S. PATENT DOCUMENTS

| | | |
|---|---|---|
| 4,793,556 A | 12/1988 | Sharp |
| 5,598,200 A | 1/1997 | Gore |
| 5,749,937 A | 5/1998 | Detering et al. |

(Continued)

FOREIGN PATENT DOCUMENTS

WO     WO-96/22884 A1     8/1996

OTHER PUBLICATIONS

M. Orme, Q. Liu, and R. Smith, "Molten Aluminum Micro-Droplet Formation and Deposition for Advanced Manufacturing Applications" Aluminum Transactions Journal, vol. 3, (1) pp. 95-103 Jul. 2000.

*Primary Examiner* — George Wyszomierski
(74) *Attorney, Agent, or Firm* — Womble Bond Dickinson (US) LLP; Deborah M. Vernon; Heath T. Misley

(57) ABSTRACT

Systems, methods, and devices are disclosed for producing quantum particles (e.g., quantum dots) having a uniform size by vaporization of molten precursor droplets. More particularly, the present technology produces quantum dots by melting or liquefying solid and substantially pure precursor materials followed by production of uniformly sized droplets of molten precursor by use of a droplet maker into a microwave generated plasma torch.

1 Claim, 4 Drawing Sheets

(56) References Cited

U.S. PATENT DOCUMENTS

| | | |
|---|---|---|
| 5,788,738 A | 8/1998 | Pirzada et al. |
| 8,016,944 B2 | 9/2011 | Kortshagen et al. |
| 8,748,785 B2 | 6/2014 | Jordan et al. |
| 8,945,673 B2 | 2/2015 | Mangolini et al. |
| 8,951,496 B2 | 2/2015 | Hadidi et al. |
| 9,166,170 B1 | 10/2015 | Perry et al. |
| 9,202,688 B2 | 12/2015 | Gonen Williams et al. |
| 9,242,224 B2 | 1/2016 | Redjdal et al. |
| 9,307,625 B2 | 4/2016 | Rollinger et al. |
| 9,321,071 B2 | 4/2016 | Jordan et al. |
| 2005/0253905 A1 | 11/2005 | Orme-Marmerelis et al. |
| 2006/0093306 A1* | 5/2006 | Kawasaki ............... B82Y 20/00 385/147 |
| 2007/0221635 A1 | 9/2007 | Boulos et al. |
| 2008/0173641 A1* | 7/2008 | Hadidi .................... H05H 1/30 219/690 |
| 2009/0044661 A1* | 2/2009 | Li ......................... B01J 19/088 75/10.19 |
| 2013/0270261 A1 | 10/2013 | Hadidi et al. |
| 2014/0155249 A1 | 6/2014 | Hadidi et al. |
| 2014/0227548 A1* | 8/2014 | Myrick .................. C06B 45/30 428/570 |
| 2015/0126355 A1 | 5/2015 | Hadidi et al. |
| 2016/0228903 A1 | 8/2016 | Redjdal et al. |
| 2016/0272883 A1* | 9/2016 | Yamane ................. C09K 11/02 |
| 2016/0322541 A1 | 11/2016 | Liu et al. |

\* cited by examiner

APPARATUS AND METHOD FOR THE PRODUCTION OF QUANTUM PARTICLES

FIELD OF THE DISCLOSURE

The present disclosure relates to systems, methods, and devices for producing quantum particles (e.g., quantum dots). More particularly, the present disclosure relates to systems, methods, and devices for producing quantum particles having a uniform size by vaporization of droplets formed from a melt of solid materials (i.e., a melt made from heating solid material(s) to a temperature above its melting temperature).

BACKGROUND OF THE DISCLOSURE

Quantum dots (QDs) are of interest in a number of fields, including electronics, photovoltaics, computing, imaging, catalysis, and medicine. Quantum dots are a form of semiconductor nanoparticles having a small size on the order of about 1 to about 100 nm, or from about 1 to about 10 nm, and which may have optical, electronic, or magnetic properties which vary from those of bulk materials. In particular, many of these properties may vary with the size of the individual dots. That is, one or more material properties can be altered or changed by merely a change in size of the dot through the angstrom and nanometer scales. For example, in general conductivity of metals typically goes down as temperature goes up. The rate of change of conductivity with temperature may be altered by size changes in the nanometer scale. As a result, tight control over size is an important factor in the manufacture of quantum dots. These properties may vary with the size of the particles either in a linear or continuous proportion with size changes, or in a quantized fashion, that is the value associated with a given property may change in a step-wise manner at particular sizes of the particle, but will be relatively constant in-between those steps.

Other factors that can affect the quality or commercial manufacture of quantum dots include purity and stoichiometry. For example, the lack of control over purity, such as by the presence of contaminants may interfere with the formation of the desired crystalline structure or result in broadening of the electronic and optical characteristics of the particles.

Stoichiometry of quantum dots is an important consideration. The particular stoichiometry may control the ability of particles to form at all, as well as characteristics (electrical, optical, magnetic, etc.) of the quantum dot. Some quantum dots may have two or more components which are each present in substantially comparable concentrations, e.g. 1:1, 2:1, 3:1, 4:1, 5:1, 10:1. Other quantum dots may have one or more dopants which are present in much smaller quantities, such as 100:1, 500:1, 1000:1. Quantum dots may also have both one or more stoichiometric components and one or more dopants.

Precise control of particle size may also critical to many applications. The electrical and optical characteristics of any given particle may depend on its size, whether in a quantized or proportional relationship. In addition to the size of individual particles, the distribution of size within a population of the same quantum dot may also been important. In many applications, a narrow size distribution will be desired so that characteristics that correspond to size will also be relatively narrow, e.g., narrow absorbance and emission bands. Size effects may be proportional within certain size domains and may be quantized within certain other size domains.

Existing synthetic methods for forming quantum dots may largely be grouped as physical and chemical methods. Physical methods include inert gas condensation, arc discharge, ion sputtering, laser ablation, and pyrolysis. Chemical methods may be grouped under various categories, such as by solvent used (aqueous or organic) or conditions of the reaction (e.g., solvothermal reactions carried out above the normal boiling point of the solvent by applying high pressure, or arrested precipitation reactions at high pH).

Conventional synthetic methods are plagued with multiple problems. For example, chemical methods may utilize hazardous or expensive solvent precursors. In addition, disposal of waste solvents can be expensive. Further, efficient conversion of precursor material plagues both synthetic method routes. That is, typically a large amount of waste is generated in processing the precursor materials in comparison to the amount of quantum dots manufactured.

Another measure of efficiency relates to control over particle size. Where particle size is widely distributed, it may be necessary to separate the desired product particles and discard particles outside the appropriate tolerance. This results in a further reduction is efficiency.

SUMMARY OF THE TECHNOLOGY

The current technology relates to a novel means for manufacturing quantum particles (e.g., quantum dots), through the use of a droplet maker—plasma chamber system. The system can achieve one or more of high purity, a narrow size distribution, and/or desirable electronic and optical characteristics in the product quantum dots. Furthermore, the system can operate at lower cost, more rapidly, and/or with greater environmental sensitivity, as compared to existing methods.

In an embodiment, the present disclosure relates to a system for the manufacture of quantum dots from a solid precursor material (i.e., from a molten melt made from heating solid material at or above its melting temperature). The system includes a molten material droplet maker capable of providing substantially uniformly sized droplets of a molten material while maintaining the droplets in a molten state, the molten material being formed from the solid precursor material; a plasma chamber in communication with the droplet maker and disposed to receive a flow of molten droplets from the droplet maker; at least one inlet for introducing a gas or vapor into the plasma chamber; an energy source (e.g., a microwave energy source) for forming the plasma, the energy source in communication with the plasma chamber and disposed to apply energy to the gas or vapor in the plasma chamber to form the plasma at a location within the plasma chamber to permit the flow of molten droplets to be vaporized to form a quantum particle precursor material; and a quenching chamber in communication with the plasma chamber and disposed to receive the quantum particle precursor material, the quenching chamber adapted to quench the quantum particle precursor material to inhibit growth and to form the quantum particles.

In an embodiment, of the above system for the manufacture of quantum dots from a solid precursor material requires that the substantially uniformly sized droplets of molten material each has a droplet diameter that is within 50% (e.g., 25%, 10%, 5%) of a predetermined droplet size. In another embodiment, the present disclosure relates to a system for the manufacture of quantum dots from a solid precursor material (e.g., molten melt of the solid material) where the energy source includes a microwave energy source. In an embodiment, the present disclosure relates to a system for the manufacture of quantum dots from a solid precursor material where the microwave energy source has a radiation frequency from about 900 MHz to about 5900 MHz. In an embodiment, the present disclosure relates to a system for the manufacture of quantum dots from a solid precursor material where the droplet maker includes a heating element disposed to maintain the molten material formed from the solid precursor material in the molten state. In an embodiment, the present disclosure relates to a system for the manufacture of quantum dots from a solid precursor material includes a piezo electric actuator, a flexible plate, and at least one capillary for delivery molten material. In an embodiment, the present disclosure relates to a system for the manufacture of quantum dots from a solid precursor material including a low-pressure pump in communication with the quenching chamber and disposed to produce low pressure within the quenching chamber. In an embodiment, the present disclosure relates to a system for the manufacture of quantum dots from a solid precursor material where the quenching chamber comprises one or more exterior walls and a cooling fluid source, at least one exterior wall comprising a plurality of holes, the plurality of holes disposed to receive a flow of cooling fluid from the cooling fluid source.

In an embodiment, the present disclosure relates to a method for the manufacture of quantum particles (e.g., quantum dots) from a solid precursor material. The method includes melting the solid precursor material to create a molten precursor material; forming droplets of the molten precursor material; vaporing the droplets within a plasma to form a plasma treated vapor; and quenching the plasma treated vapor to form quantum particles.

In an embodiment, the present disclosure relates to a method for the manufacture of quantum dots from a solid precursor material including introducing a second vapor including a functionalizing material. The second vapor can be added prior to the quenching step, during the quenching step, or after the quenching step. In an embodiment, the present disclosure relates to a method for the manufacture of quantum dots from a solid precursor material including introducing a second vapor prior to the quenching step, the second vapor including an allowing material to form a mixture with the plasma treated vapor. In an embodiment, the present disclosure relates to a method for the manufacture of quantum dots from a solid precursor material where the second vapor including silane for forming silicon based alloys. In an embodiment, the present disclosure relates to a method for the manufacture of quantum dots from a solid precursor material including generating the plasma, which includes generating microwave radiation, guiding microwave radiation to the plasma chamber using a waveguide, introducing an entrainment gas into the plasma chamber, and igniting the plasma. In an embodiment, the present disclosure relates to a method for the manufacture of quantum dots from a solid precursor material including mixing the molten precursor material prior to forming droplets. In an embodiment, the present disclosure relates to a method for the manufacture of quantum dots from a solid precursor material where the quenching step occurs partially in a plasma chamber and partially in a quenching chamber. In another embodiment, the present disclosure relates to a method for the manufacture of quantum dots from a solid precursor material where the vaporizing step occurs in a plasma chamber and the quenching step occurs in a quenching chamber, and a pressure gradient is established and such that the quenching chamber is maintained at a lower pressure than the plasma chamber. In an embodiment, the present disclosure relates to a method for the manufacture of quantum dots from a solid precursor material including maintaining the plasma chamber between about 700 to 1100 Torr and maintaining the quenching chamber between about 1 to 100 Torr. In an embodiment, the present disclosure relates to a method for the manufacture of quantum dots from a solid precursor material where the step of forming droplets comprises agitating the molten precursor material with a piezoelectric actuator and forming the molten precursor material through at least one capillary. In an embodiment, the present disclosure relates to a method for the manufacture of quantum dots from a solid precursor material where the quenching step is achieved by causing supersaturation, nucleation and controlled growth (e.g., limited growth) to form the quantum particles/dots. In an embodiment, the present disclosure relates to a method for the manufacture of quantum dots from a solid precursor material where the quenching step includes establishing low pressure in the quenching chamber, the low pressure being sufficient to achieve rapid expansion and condensation of the vapor. In an embodiment, the present disclosure relates to a method for the manufacture of quantum dots from a solid precursor material where at least 50% of the precursor material consumed in the method is converted into quantum dots. In an embodiment, the present disclosure relates to a method for the manufacture of quantum dots from a solid precursor material where the quenching step comprises creating a controlled gaseous environment in which the plasma treated vapor passes through. In an embodiment, the present disclosure relates to a method for the manufacture of quantum dots from a solid precursor material where the controlled gaseous environment includes one or more elemental gases. In an embodiment, the present disclosure relates to a method for the manufacture of quantum dots from a solid precursor material where the controlled gaseous environment includes one or more molecular gases. In an embodiment, the present disclosure relates to a method for the manufacture of quantum dots from a solid precursor material where the quenching step includes flowing a cooling fluid proximate the plasma treated vapor. In an embodiment, the present disclosure relates to a method for the manufacture of quantum dots from a solid precursor material including a functionalizing step, which includes providing a functionalizing gas or vapor within the quenching chamber where the functionalizing gas or vapor contains a function group precursor. In an embodiment, the present disclosure relates to a method for the manufacture of quantum dots from a solid precursor material, wherein the solid precursor material is a material selected from the group consisting of: tin, selenium, aluminum, gallium, indium, cadmium, zinc, lead, bismuth, europium, arsenic, iodine, thallium, silver, strontium, lithium, barium, and alloys of the same. In some embodiments, the solid precursor material is any element or alloy with a melting temperature lower than about 1000 C. In general these solid precursor materials can be used to form a semiconductive material. In one embodiment, the method of the present disclosure further includes a filtering or collection step.

In an embodiment, the present disclosure relates to a method of manufacturing a quantum dot having a core at least partially surrounded by a shell. The method includes: melting a core precursor material to create a molten core precursor material; forming core precursor material droplets from the molten core precursor material; vaporizing the core precursor material droplets within plasma; forming quantum dot cores from the vaporized core precursor material droplets; melting a shell precursor material to create a molten shell precursor material; forming shell precursor material droplets of the molten shell precursor material; vaporizing shell precursor material droplets within plasma; and forming quantum dot shells on the quantum dot cores.

BRIEF DESCRIPTION OF THE DRAWINGS

The foregoing and other features provided by embodiments of the present technology will be more fully understood from the following description when read together with the accompanying drawings.

DETAILED DESCRIPTION OF THE TECHNOLOGY

Figure 1:
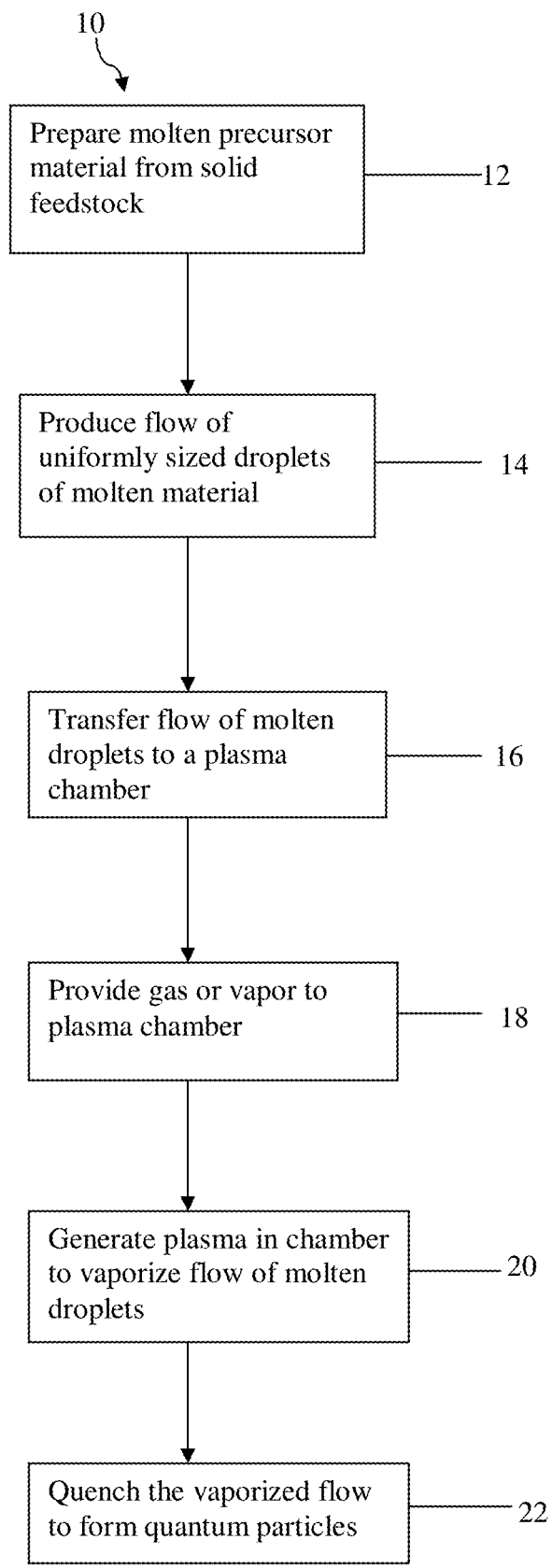
FIG. 1 shows a flow chart of a method for making quantum particles (e.g., quantum dots) in accordance with an embodiment of the present disclosure.

Embodiments of the present disclosure may produce quantum particles, such as for example, quantum dots, from a substantially pure solid material feedstock with a high degree of efficiency of conversation and wherein a given population of particles are substantially uniformly sized. These may be highly valuable properties for quantum dots. In embodiments, the substantially pure solid material feedstock has relatively low melting temperature. That is, in some embodiments, the melting temperature of the solid precursor is less than about 2,000 degrees F. In certain embodiments, the melting temperature of the solid precursor is less than about 1,450 degrees F. In certain embodiments, the melting temperature of the solid precursor materials is within a range of 800 degrees F. to about 82 degrees F. That is, the melting temperature of the solid precursor materials, in some embodiments, is above room temperature but below 2,000 degrees F.

With respect to the feedstock, the ability to use a substantially pure solid material feedstock presents an advantage over existing chemical quantum dot synthesis. In wet chemical synthesis of quantum dots, harsh and environmentally unfriendly solvents detract from achieving commercial sustainability. For example, in making some quantum dots, liquid organometallic material is typically the source of precursor material. Use of an organometallic precursor may add cost and complexity, since the precursor itself must be purchased or synthesized. It may also reduce the yield of the quantum dots (QDs) synthetic process, since a substantial portion of the reaction mixture results in the formation of an organic moiety, and not a quantum dot. After synthesis of the QD, some byproduct of the synthesis related to the organic moiety will be formed which must be disposed. Some such organic compounds may be toxic. Additionally, the presence of portions of reacted and unreacted organic substances within the solution may reduce the purity and uniformity of the finished product.

In addition to the above disadvantages, wet chemistry solutions cannot be used to synthesize certain materials. For example, nitride quantum dots generally cannot be synthesized with wet chemistry and are often difficult to manufacture due to complications including material stability, such as low decomposition temperatures, difficulties in limiting oxide and diatomic nitride formation, nitrogen deficiency and particle agglomeration. In methods using conventional systems to process nitride quantum dots, high temperature solutions such as metal oxide chemical vapor deposition (MOVCD) or molecular beam epitaxy (MBE) has been utilized. These manufacturing routes suffer from slow deposition/production rates, making this route commercially unfeasible. In addition, substrate materials are expensive and processing conditions require frequent cleaning and monitoring of the deposition environment. Other methods used in place of wet chemistry include, laser ablation of substrate materials. Laser ablation techniques involve ablating a target in a controlled atmosphere to deposit a material on a substrate. Like MOVCD and MBE, laser ablation techniques suffer from a low production rate and high cost of manufacture. In addition to these problems, it is hard to control deposition size and size distribution as a laser spark is used to ablate the material that then transfers to a cooler substrate located within the deposition chamber. As a result of its inability to have a tight control over size and size distribution, laser ablation is a poor choice for the manufacture of quantum dots.

An advantage of one or more embodiments of the present technology is an ability to convert solid precursor materials to QDs with a high percent yield (that is, actual yield/theoretical yield). In theory, this yield can be as high as 100%, as all the solid precursor material can theoretically be transformed into a quantum particle product. But in practice there may be some material lost to the walls of the plasma chamber or system that will reduce the yield slightly from 100% (e.g., 99.5%, 99%, 98.5%; 98%, 97%, 95%). As a result of the high percentage yield, embodiments of the present technology are well suited for commercialization. In particular, QDs or other quantum particles which contain particularly expensive precursor materials, can be manufactured in large quantities at a relatively low cost to provide for an available commercial route for quantum dot manufacture.

Another advantage of embodiments hereof is the ability to achieve a uniform particle size. This advantage allows the current technology to successfully and reproducibly manufacture a quantum dot and an appropriate size distribution for a population of quantum dots of a given type. In some embodiments, the devices and methods described herein provide uniform conditions for successive quantum dot particles over an extended period that a high degree of uniformity within the quantum dot particles may be achieved. The present technology may be able to achieve a considerably larger quantity of product within a given run than by other systems. Existing synthetic methods, especially chemical methods, may rely upon a batch-type manufacturing process in which the actual amount of quantum dot forming material within each batch may be relatively small compared to reactive liquid and other chemicals which result in by-products or waste. One such example includes forming a quantum dot by wet chemical methods. Specifically, the organometallic precursor liquid compounds used in a reaction to form the quantum dots have a minimal concentration of metal ions as compared to the other constituents of the organometallic precursors. In addition, such methods may not scale well for manufacture of more product quantum dots, as the vessels for handling the reactions and devices needed to extract waste become unruly.

The present technology may achieve an increased output for several reasons, including, the use of a substantially pure solid precursor materials, such that substantially all of the material may be used with the quantum dots; the ability to scale up the molten material melt chamber to hold a larger quantity of molten material without requiring the scale-up of other system components, unless desired; the ability in some systems to add additional solid material feedstock to the molten metal melt chamber during operation to extend the period of operation, or to provide for more than one molten metal melt chamber in order to increase the capacity of the system and permit one chamber to be refilled while another continues to provide supply.

With respect to the materials which can be used herein as solid precursors, some materials may be more or less suitable for use in the present technology based upon factors such as melting point, viscosity of the molten material and so on. Additionally, toxicity and stability may require operating the present technology with containment means to control e.g., gaseous portions of the product or airborne particulates. Embodiments of the present technology are anticipated for melting points up to about 1,000° C. (less than 2,000° F.). In certain embodiments, the melting point of the precursor will be much less than 1,000° C., and preferably within a range of 700° C. to 27° C. Additionally, it may be appreciated that the present technology may be coupled with other known technologies to achieve quantum dots in which one or more pure material components would melt at too high a temperature for the current technology. For example, silicon, which melts at about 1,414° C., may be added to the system as silane vapor ($SiH_4$), to be coupled with a second material (i.e., having a melting temperature less than about 1,000° C.) prepared using the present technology to create a quantum dot including both the 1,000° C. or less melting point material and silicon (e.g., tin-silicon quantum dot).

A non-limiting list of exemplary materials which can be used as the solid precursor materials includes: tin, selenium, aluminum, gallium, indium, cadmium, zinc, lead, bismuth, europium, arsenic, iodine, thallium, silver, strontium lithium, barium, and alloys of the same. It is also possible to create alloys or mixtures by using solid particles of two different materials, heating the two materials and mixing the molten materials together. The materials may more particularly include metals and metalloids, but are not limited to metals and metalloids.

An embodiment of a method 10 to manufacture quantum dots is provided in FIG. 1. The method includes preparing a molten precursor material from solid feedstock (step 12) (e.g., heating solid feedstock to a temperature at or above its melting temperature to create a melt from the solid feedstock); producing a flow of uniformly sized droplets of molten precursor material (step 14); transferring flow of uniformly sized droplets of molten precursor material to a plasma chamber (step 16); providing gas or vapor to the plasma chamber with the molten droplets (step 18); generating a plasma in the chamber to vaporize the precursor material (step 20)(e.g., directing energy to the plasma chamber to ignite the vapor/gas forming the plasma); and quenching the vaporized precursor material to form the quantum dots (step 22). To perform method 10 requires a system which includes components capable of or designed to: (1) make a molten material from solid feedstock (e.g., a heater); (2) make a flow of uniformly sized molten droplets (e.g., a droplet maker that can control size while maintaining the molten state of the flow); (3) make a plasma (e.g., a plasma torch and plasma chamber in communication with the flow of droplets as well as at least one source of gas or vapor); and (4) collect the quantum dots from the plasma chamber (e.g., a collection unit which can include a quenching chamber).

In general, the heater can be any heater capable of forming a molten material from solid feedstock. In order to create droplets of the solid precursor materials themselves—without requiring the use of a liquid precursor (e.g., an organometallic precursor), the use of a heater or other thermal energy conduction device is necessary to melt the solid precursor materials. The heater may be any type of heater suitable for increasing the temperature within a desired range, such as an electrical resistor, a heat pump, infrared heater (e.g., quartz tungsten heater), microwave heater, induction heater, or laser heater.

In some embodiments the heater and the droplet maker are separate components. That is, the heater forms a molten material from the solid feedstock in a molten melt chamber and delivers the molten material to a droplet maker capable of producing uniformly sized droplets of a molten flow. In other embodiments; the heater and the droplet maker are integrated such that the molten material is produced within a reservoir of the droplet maker. The necessity for a heater within the droplet maker may be determined by a number of factors, such as the melting point of the solid precursor material, the thermal conductivity of the precursor material, and the degree to which the components of the system are insulated. For example, in an embodiment wherein the melting point is relatively low, thermal conductivity is relatively low, and insulation is relatively high, the necessity for additional heating will be reduced because the molten material will more easily remain a liquid as it travels from the molten melt chamber to the droplet generator. In any embodiment, the heater and droplet maker of a system of the present disclosure must be able to transform solid feedstock into a molten state, create a flow of uniformly sized droplets from the molten material, and maintain the molten state (i.e., substantially maintain the molten state) of the uniformly sized droplets when delivering flow to the plasma chamber for the creation of quantum dots. These requirements dictate that the droplet maker and its components used control and tune size of the droplets be equipped to handle molten materials. That is, the components needed for generation of the droplets be able to withstand temperatures and other conditions of the molten material. Further the droplet maker needs to be able to not only control the size of each droplet within in a flow to create uniformly sized droplets, but also to be able to maintain this control even after exposure to the molten material during a manufacturing run. In general, uniformity means that the droplets have a 10% diameter size variation or less. In some embodiments, the variation is within 5% between droplets (e.g., 5%, 4%, 3%, 2%, 1%, 0.5%). In some embodiments, the droplet maker needs to be tunable. That is, the droplet maker, in some embodiments, allows an operator to change or select the size of the droplets. For example, in a first manufacturing run, an operator selects a droplet size of 80 micrometers; while in a second manufacturing run, the operator selects a droplet size of 10 micrometers. In all embodiments, the droplet maker needs to be capable of producing micrometer or sub-micrometer sized droplets. In general, the micrometer to sub-micrometer range includes 0.1 micrometers to about 250 micrometers.

An example of a droplet maker which is capable of providing a flow of uniformly sized droplets with tunable size control is provided in U.S. Pat. No. 9,321,071, and entitled "High frequency uniform droplet maker and method" (incorporated herein by reference in its entirety). Further, molten droplet makers are known and can be used as a component of the present disclosure. For example, U.S. Pat. No. 9,307,625, entitled "Droplet dispensing device and light source comprising such a droplet dispensing device" (incorporated herein by reference in its entirety) discloses a device with improved precision of droplet size and trajectory even when the liquid used is molten material from a heated reservoir. US 2005/0253905, entitled "Droplet generation by transverse disturbances" (incorporated herein by reference in its entirety) discloses a droplet maker that enables the formation of molten droplets due to capillary stream breakup and minimizes variation in droplet formation time by applying transverse disturbance to initiate instability of the capillary stream's surface. Other known molten droplet makers are disclosed in U.S. Pat. No. 5,598,200 and WO 96/22884 (PCT/US96/01132) both entitled "Method and apparatus for producing a discrete droplet of high temperature liquid", and "Molten Aluminum Micro-Droplet Formation and Deposition for Advanced Manufacturing Applications" by Orme et al and accepted for publication in Aluminum Transactions Journal, 2000, all three disclosures are incorporated herein in their entirety.

The droplet diameters preferred for the present technology may be on the order of 1 to 200 microns. It is advantageous to form small droplets (e.g., on the range of 1 to 25 microns) that are substantially uniform in size (e.g., each of the droplets has a size that is within 50%, 30%, 25%, 10%, 8%, 5% from a predetermined droplet size). Without wishing to be bound by theory, it is believed that substantial uniformity of droplet size combined together with a small droplet size (e.g., less than 200 microns, less than 100 micron, less than 50 microns, less than 25 microns) allows for consistent and uniform evaporation of the droplets when subjected to a plasma. Uniformity and consistency in vaporization of the droplets create an advantageous environment for nucleation, crystallization, and initiation of growth of a quantum particle. As a result, in certain embodiments of the present technology, the droplet makers are capable of forming a stream of substantially uniform droplets, each droplet having a droplet size of about 50 microns (±25%).

In general, the plasma torch may be any plasma torch capable of forming a plasma by the supplying microwave radiation to a gas. The droplets formed by the droplet maker may then be introduced to and processed within the plasma formed by the plasma torch. Examples of plasma torches may be found in U.S. Pat. No. 8,748,785 entitled "Microwave Plasma Apparatus and Method for Materials Processing," U.S. Pat. No. 8,951,496 entitled "Method for Making Amorphous Particles Using a Uniform Melt-State in a Microwave Generated Plasma Torch," U.S. Pat. No. 9,242,224 entitled "Method for the Production of Multiphase Composite Materials Using Microwave Plasma Process," and in US Publication No. 2013/0270261 entitled "Microwave Plasma Torch Generating Laminar Flow for Materials Processing," (each of the foregoing incorporated in full herein by reference).

The collection of the quantum dots may be accomplished by a collector unit. The collector unit may be in communication with the quenching chamber or both may be one component. The collection process may be designed to avoid or reduce agglomeration of the quantum dots, particularly for those quantum dots prone to agglomeration. For example, the quantum dots may be collected in filters as described in US Publication No. 2015/0126335 entitled "Method for Making Amorphous Particles Using a Uniform Melt-State in a Microwave Generated Plasma Torch." The collector unit may provide for further processing of the quantum dots such as filtering, sorting, cleaning, packing, etc.

The quantum dots made with the technology described herein can include various features. For example, the quantum dots may be made of a single material or of more than one material. Where the quantum dot is made with more than one material, the two materials may be mixed throughout the structure of the quantum dot (two or more solid precursors can be melted and mixed to create a homogeneous melt), or may be in a core-shell arrangement, where one material or mixture of materials forms a core while a second material or mixture of materials forms a shell covering the core. Further, the quantum dots may additionally have an outer functionalizing layer, which may be an organic moiety. The functionalizing layer may impart properties, such as decreasing agglomeration of the quantum dots, providing linkers through which the quantum dot may be bonded to, e.g., a substrate, or adding complementary electronic or optical properties (e.g., organic chromophores suitable for quenching quantum dot emissions).

Figure 2:
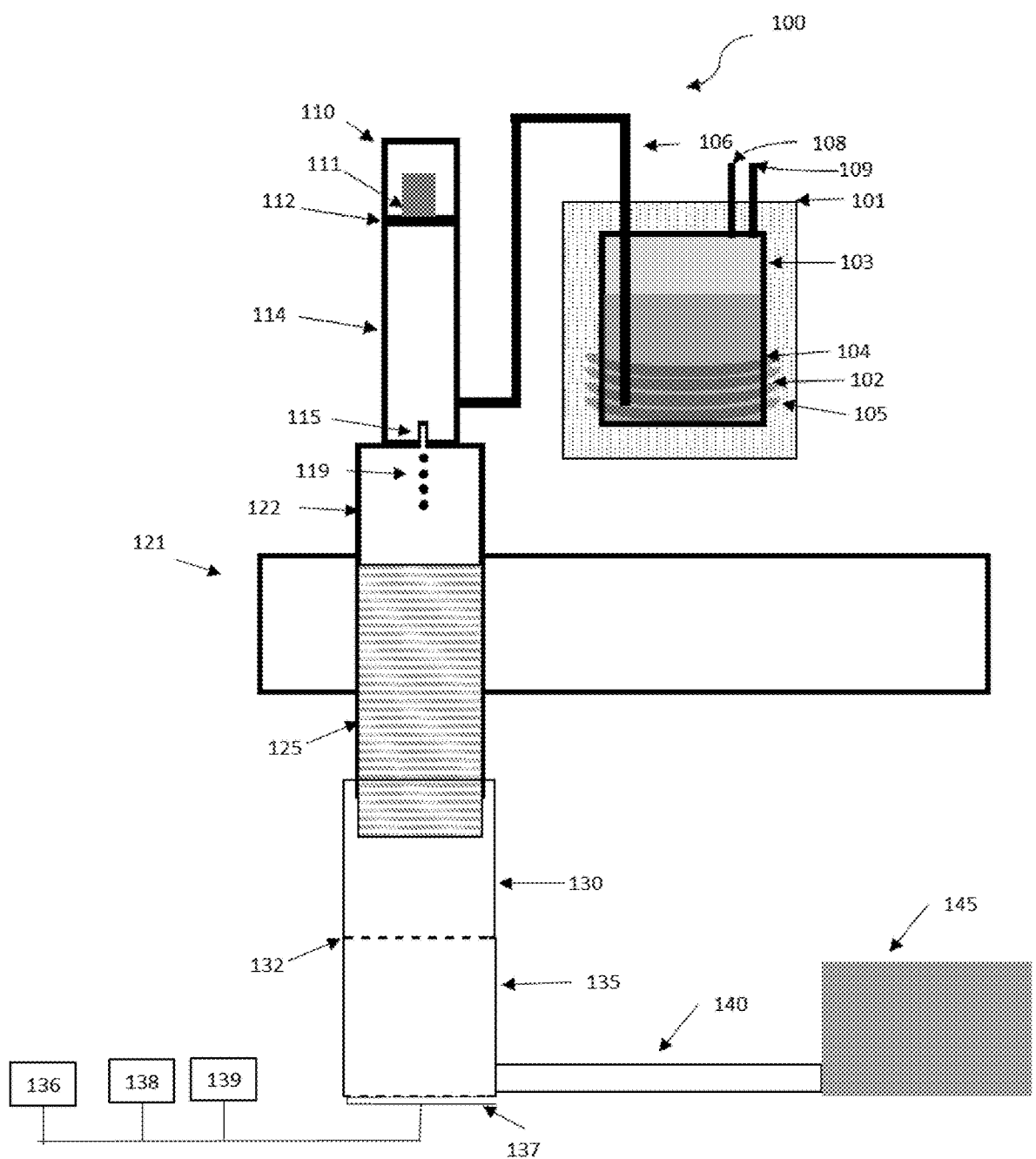
FIG. 2 shows a schematic view of a system for making quantum dots according to the present disclosure.

An embodiment of a melt chamber is shown in FIG. 2, which shows system 100 having molten melt chamber 101. Molten melt chamber 101 includes a body 104 which is surrounded by insulation 102. The upper portion of body 104 is occupied by a layer of pressurized gas 103. The remainder of the body may be occupied by the precursor material, in either solid form, or in molten form if a heat treatment has been applied. Encircling body 104 is heating element 105. Heating element 105 is depicted as a heating element which spools around a portion of body 104 however the heating element may be some other type of heating element suitable for melting and maintaining the solid material precursor within body 104 in a liquid/molten phase. Heating element 105 provides the thermal energy used to melt the solid material within the molten melt chamber 101. Molten melt chamber 101 is additionally provided with a gas supply 108 and a vent 109. Gas supply 108 and vent 109 are in communication with the layer of pressurized gas 103 and may increase or decrease the pressure within the layer of pressurized gas 103 by increasing or decreasing the amount of gas present. The gas supply 108 may also be capable of substituting one gas for another within the layer of pressurized gas 103, if desired, or achieving a purge of the molten metal melt chamber 101 as described below. Molten transport line 106 has one end point in fluid communication with the molten melt chamber 101 to transport molten material from the molten melt chamber 101 to droplet maker 110.

In operation, the molten melt chamber may be operated by loading the chamber with the amount of solid material feedstock which is desired to be used. Then, the melt chamber temperature may be increased to melt the feedstock. In order to provide sufficient purity within the precursor supply, the melt chamber may be purged with a gas, such as an inert gas and then that gas then drawn off. This may remove species introduced from the atmosphere, particularly including atmospheric oxygen, which may be reactive, as well as contaminants which have been released during the melting of the solid precursor material, which may have evaporated, pyrolyzed, etc. The purge gas may be an inert gas, such as argon. In an embodiment, a similar result may be achieved by drawing a vacuum within the molten melt chamber such that any contaminants or trace components may be removed. In an embodiment, a mechanical stirrer may be added to the melt chamber to facilitate melting and/or mixing of one or more precursor materials and to release contaminants present within the chamber after melting of the material.

Once the molten metal has been satisfactorily prepared and, in some embodiments, purified, a pressure of gas may be applied to the molten metal melt chamber. The pressure of gas may be about 5 to about 100 Torr. The pressure may be varied, for example, to change the rate at which the molten material is supplied. The pressure may be about 5 Torr, about 10 Torr, about 20 Torr, about 30 Torr, about 40 Torr, about 50 Torr, about 60 Torr, about 70 Torr, about 80 Torr, about 90 Torr, or about 100 Torr. These values may also be used to define a range, such as from about 30 Torr to about 80 Torr. Preferably, this gas will substantially form a separate layer over the molten material, which may then exert a force there against, tending to push the melt into molten transport line 106. The gas chosen should generally be selected for minimum reactivity with the metal present in the molten metal melt chamber. In some cases, air may be used, or an inert or relativity inert gas, such as $N_2$, Ne, Ar, Kr, Xe, etc, Other embodiments of molten melt chamber may use different components to provide comparable functionality. For example, the force used to achieve the transfer of the molten material may be some other means than the action of the layer of pressurized gas 103, for example a pump, such as a peristaltic pump or screw pump.

The combination of the heater with the materials used for the molten melt chamber and the droplet maker may determine the range of melt temperatures accessible to the system. The material for the body 104 of the molten melt chamber 101 may be selected to be resistant to the temperatures associated with the current technology. For example, ceramics, metals, or alloys may be used, including stainless steel, or steel coated with stainless steel, vanadium, titanium, and the like. In some embodiments, the material selected for use of the body 104 is not reactive or chemically inert/not-corrosive to the feedstock precursor material. As a result of using a material that can not only withstand the temperature supplied to melt the feedstock, but also a material that is non-reactive with the feedstock material, purity of the feedstock can be maintained.

Embodiments may additionally provide further heating within the droplet maker and within lines between the melt chamber and the droplet maker (if any), sufficient to maintain the molten state of the solid precursor material throughout the formation of the droplets.

The Droplet Maker

Droplet maker 110 depicts an embodiment that includes reservoir 114, actuating unit 111, surface 112, and nozzle 115. Actuating unit 111 may be any actuating unit capable of achieving a uniform perturbation within reservoir 114 such as, e.g., a piezoelectric actuator, a piston-driven actuator, or an acoustic actuator. Surface 112 forms a portion of reservoir 114 and communicates the action of actuating unit 111 to the contents of reservoir 114. Molten transport line 106 feeds reservoir 114 and, during operation, maintains reservoir 114 substantially full. Nozzle 115 may be any nozzle, orifice, slit, grating, capillary, tube, channel, or aperture in communication with or a feature of reservoir 114 through which material within reservoir 114 may be released as droplets 119 by the action of actuating unit 111. In some embodiment, the droplet maker includes more than one, distinct and separate nozzles to create multiple droplet flows. The droplet maker may be any suitable droplet maker, such as any one of the droplet makers described in publications incorporated by reference herein.

Droplets 119 are of uniform diameter if the wavelength of the uniform perturbation pulses created by actuating unit 111, satisfy jet stream break up according to Webber's law for viscous fluids:

$$\lambda = \sqrt{2}\,\pi d_j \sqrt{1 + 3\eta/\sqrt{\rho \sigma d_j}}$$

where $d_j$ is the jet diameter, $\eta$ is the fluid viscosity, $\rho$ is the fluid density, $\sigma$ is the surface tension, and $\lambda$ is the wavelength of the perturbation pulses. The droplets produced are uniform and their diameter, $d_d$, is approximately 1.89 times that of the jet diameter, $d_j$.

In embodiments, surface 112 and/or reservoir 114 may be constructed of a material having low thermal conductivity in order to decrease the heating of actuating unit 111 or other components of droplet maker 110 by the high temperature molten material within reservoir 114. Alternatively, actuating unit 111 may be in communication with, but located remotely from, surface 112 and/or reservoir 114 to further reduce heating of the actuating unit 111 or other components. For example, the communication between actuating unit 111 and surface 112 and/or reservoir 114 may be provided by some length of rigid material attached to both actuating unit 111 and surface 112 and having low thermal conductivity, such that the rigid material communicates the action of actuating unit 111 to surface 112 while limiting the transfer of heat from surface 112 to actuating unit 111.

In embodiments where the actuating unit is a piezoelectric actuator, the piezo is driven at a resonant frequency to produce a repeatable deflection of the piezo. The piezo can be maintained operatively engaged with the plate using, for example, a screw, or swivel bolt, that causes the piezo to press against the plate. As the piezo is maintained in contact with the plate, the deflection of the piezo is transmitted to the rigid plate. In turn, this deflection of the piezo, which can be less than about 5.0 micrometers, is transmitted to the fluid inside the reservoir to break down a jet of fluid exiting the capillary channels. The piezo actuator produces a perturbation that dissipates radially and longitudinally. Thus, the farther from the center of the piezo actuator, the weaker the perturbation is. As will be appreciated, the size and geometry of the chamber is correlated to the size and power of the piezo actuator, the material and properties of the plate, and the viscosity of the fluid in the chamber.

The reservoir 114 is made of a relatively corrosion resistant material that can maintain its mechanical strength at temperatures up to about 1100° C., such as ceramics, stainless steel, or steel coated with stainless steel, vanadium, titanium, and the like. As a result, the reservoir 114 can contain the molten precursor materials.

Where actuating unit 111 may be selected in order to achieve uniform perturbation pulses, droplets 119 are expected to be uniform in diameter. In one embodiment, the droplet maker achieves substantially uniformity between droplets with a variation in droplet diameter of less than about 20%. For example, the variation of droplet size for droplets within a stream of droplets is within 20% (e.g., ±10% from a predetermined droplet size), within 10% (e.g., ±5% from a predetermined droplet size), within 5%, within 4%, within 3%. While not wishing to be bound by theory, it is believed that the droplet diameter uniformity is determined by the accuracy of the perturbation wavelength ($\lambda$) in the above equation where all other parameters are constant. Thus, by tailoring equipment and control of environment and materials used in the droplet maker, better control of uniformity can be achieved as shown in Webber's law provided above.

The molten droplets formed by droplet maker 110, droplets 119, may then be released into plasma torch 121. In embodiments, the droplet maker and the melt chamber may be combined in a single unit; that is, the solid material may be loaded directly into the single unit, melted therein, and the droplets released therefrom.

The Plasma Torch

Figure 3:
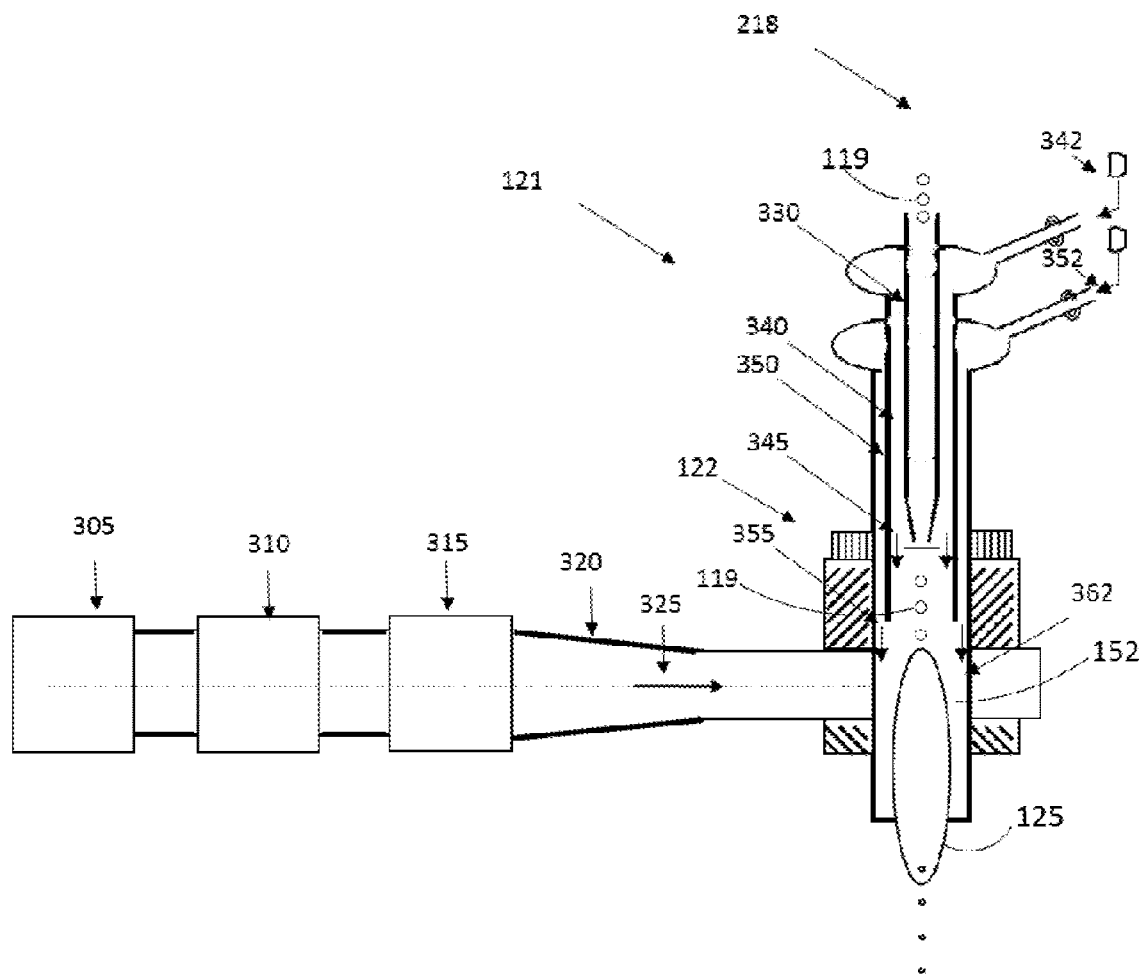
FIG. 3 shows a schematic view of a plasma torch suitable for use in an embodiment of the present disclosure.

FIG. 3 depicts an example of a plasma torch which may be used within embodiments of the present technology. In FIG. 3, droplets 119 are shown entering plasma torch 121 along line 218 within tube 330. Droplets 119 may be droplets produced by the droplet maker described herein, or may be the product of a first plasma torch in those embodiments having more than one plasma torch.

Plasma torch 121 also includes microwave source 305 (i.e., an energy source for forming the plasma), reflected power protector 310, impedance matching unit 315, and waveguide 320. Waveguide 320 guides microwave radiation 325 from microwave source 305 to plasma chamber 122 which intersects waveguide 320. Waveguide 320 is a closed structure designed so that the microwave radiation exhibits peak intensity within plasma chamber 122. Plasma torch 121 includes three concentric tubes, which are tubes 330, 340, and 350. Tube 330 carries droplets 119. Tube 340 carries an entrainment gas flow 345 supplied by entrainment gas source 342. Tube 350 carries a shrouding gas flow 355 supplied by shrouding gas source 352.

Microwave source 305 may provide microwave radiation having frequencies between about 500 MHz and about 100 GHz. More particularly, the range may be from about 900 MHz to about 5900 MHz. For example, one embodiment of a microwave source operated at 915 MHz and 75 kW. Another embodiment of a microwave source operated at 2.45 GHz. In other embodiments not shown, the energy source need not be a microwave energy source. Alternatively, the energy source could be a radio frequency radiation energy source, or other electromagnetic energy sources.

Impedance matching unit 315 communicates with the microwave source 305 and the waveguide 320 to minimize reflection of the microwave radiation 325 from the plasma chamber 122 to the microwave source 305. The plasma torch 121 can also include a reflected power protector 310 in communication with the waveguide 320. The reflected power protector 310 could be a waveguide circulator that deflects reflected portions of the microwave radiation 325 to a dump receiver (not shown). The reflected power protector 310 alternatively could be a waveguide isolator.

During operation, entrainment gas flow 345 will entrain droplets 119 within itself as it flows into plasma chamber 122. Within plasma chamber 122, microwave radiation 325 will ignite entrainment gas 345 to form plasma 125. Plasma 125 will continue to be supplied by entrainment gas flow 345 including entrained droplets 119, if any. Shrouding gas flow 355 may flow along wall 362 of plasma chamber 122 (which may be the continuation of tube 350 within plasma chamber 122) between wall 362 and plasma 125. Within plasma chamber 122, shrouding gas flow 255 provides separation between plasma 125 and wall 362 of plasma chamber 122, protecting plasma chamber 122 from the extreme temperatures of plasma 125.

A range of suitable gases is known for plasma sources. A nonreactive plasma, such as an inert gas such as helium, argon, neon, xenon, krypton or combinations of the same may be used. Alternatively, the plasma may include a reactive chemical species which is to be incorporated into the quantum dot produce. For example, nitrogen or oxygen may be included in the plasma source where a nitride or oxide quantum dot is desired (e.g., TiN quantum dots, GaN quantum dots, AlGaN quantum dots, ZnO quantum dots, etc.). The shrouding gas flow may also be a flow of inert or relatively gas such as nitrogen, helium, argon, neon, xenon, krypton, or combinations of the same.

An advantage of the present technology is that microwave excitation of the plasma enables the microwave plasma torch to provide plasma temperatures as high as about six thousand Kelvin (6000 K), nearly twice the highest-known attainable stoichiometric combustion temperatures (three thousand Kelvin (3000 K) for a hydrogen-oxygen flame). Thus, the present technology can achieve thorough heating of a material in an inert, oxidizing or reducing environment, which typically cannot be attained using an oxy-fuel torch. In addition, the plasmas created by the microwave plasma torch in accordance with an embodiment of the present technology have a substantially uniform radial temperature profile. Without wishing to be bound by theory, it is believed that the uniformity of the temperature profile in combination with the uniformity of the droplet size generated from the droplet maker together provide a preferred environment for uniform vaporization of the precursors. As a result, preferred conditions arise from the substantially uniform and consistent vaporization of individual droplets to create an advantageous environment for nucleation and crystallization of nanoparticles within the plasma chamber downstream of the plasma.

Another advantage of the present technology is that microwave excitation of the plasma jet efficiently converts more than about ninety percent (90%) of supplied microwave energy to enthalpy of the plasma jet. This efficiency exceeds that of other devices by a factor of between about two times and about three times.

Figure 4:
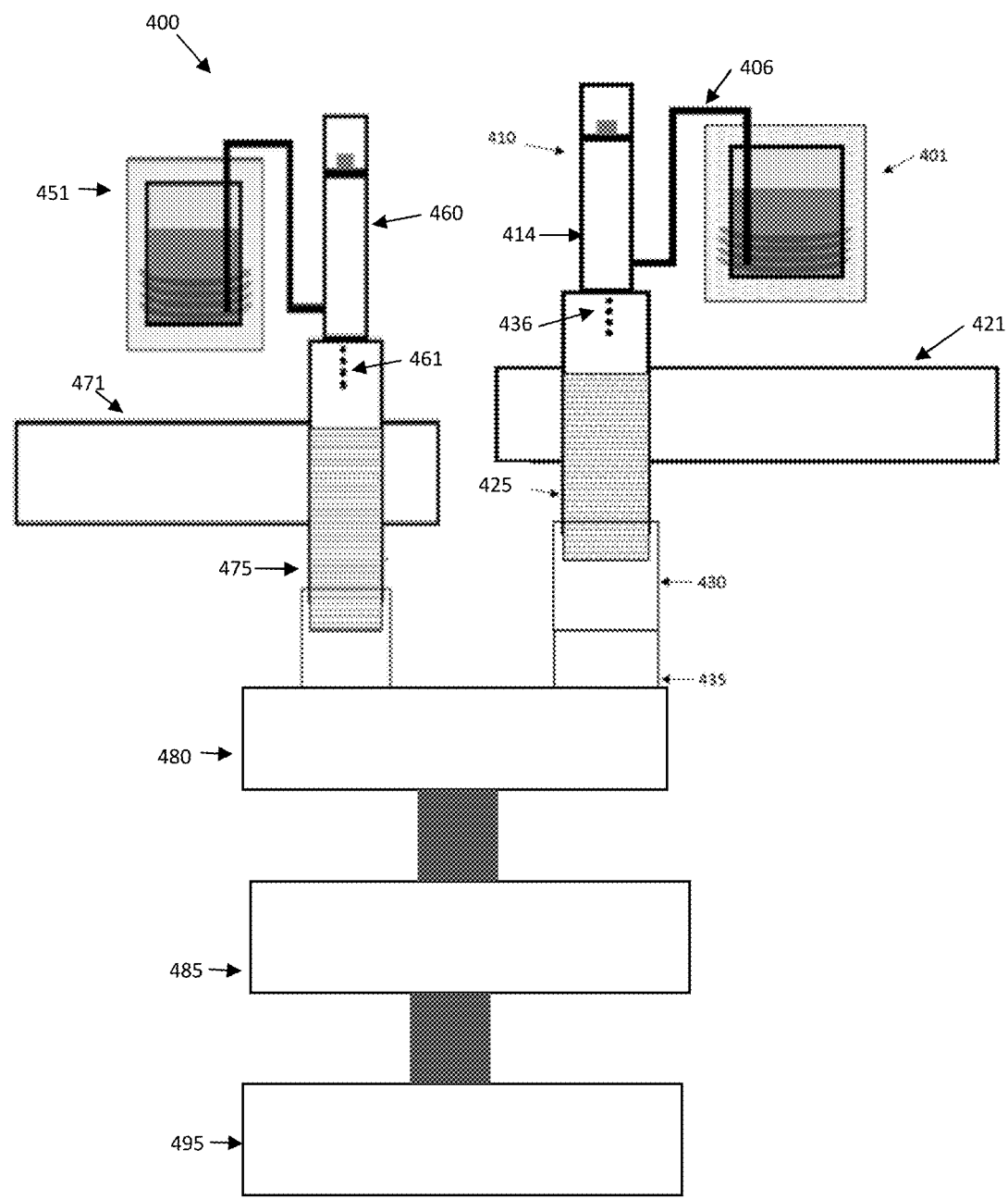
FIG. 4 shows a schematic view of a system for making quantum dots having two plasma torches according to the present disclosure.

Another advantage of the present invention is that multiple microwave plasma apparatuses can be stacked in a modular fashion because the waveguide, the impedance matching unit, and the reflected power protector cooperate to prevent interference between adjacent plasma jets. Stacking multiple microwave plasma apparatuses can permit extremely uniform heating of the process material to temperatures between about three thousand Kelvin (3000 K) and about six thousand Kelvin (6000 K). Of particular interest, stacked microwave plasma apparatuses may be arrayed to receive within each plasma successive plasma products created by the previous plasma, and plasmas may each be at different temperatures. This arrangement permits, for example, a first plasma to be used to create a quantum dot core from a core precursor while a second plasma may receive the quantum dot core and a shell precursor and produce a core covered in a shell. In this example, the second plasma may be operated at a lower temperature to reduce or eliminate re-melting of the core within the second plasma while still vaporizing the shell precursor. An embodiment of a system with two plasma torches is shown in FIG. 4. As shown, system 400 includes a first molten melt chamber 401, a first droplet maker 410, a first plasma torch 421 with a first plasma 425, a first reaction chamber 430 and a first quenching chamber 435. The products of quenching chamber 425, which may be quantum dot cores, enter chamber 480. Also, droplets prepared by second droplet maker 460 additionally enter second plasma torch 471 including second plasma 475, enter chamber 480. Downstream of second quenching chamber 485 second quenching chamber 485 and filter system 495.

While not wishing to be bound by theory, it is believed that within the plasma flowstream, the droplets of liquid rapidly vaporize, but the atoms thereof remain clustered to some degree and continue to pass through the plasma and into reactor 130, the portion of plasma torch 121 downstream of plasma 125. Within reactor 130, the temperature is sufficiently low, relative to plasma 125 and to the evaporation point of the precursor materials, that the gaseous material begins to condense and nucleation begins (i.e., in some embodiments, quenching and nucleation begin in the plasma chamber). The condensing and nucleating material continues to pass through the system at a rate which is controlled to allow for crystallization of the material. That is, rate of cooling is controlled within the reactor (i.e., the portion downstream of the plasma) to the extent that crystallization (with limited growth) can occur. As the particles transition into quenching chamber 135 through perforated surface 132, the combination of cooling and expansion is believed to quench the nanoparticle growth. As noted above, in some embodiments, an advantageous environment for producing quantum particles (e.g., QD) arises from the combination of substantially uniform droplets of precursor being delivered to a plasma with a substantially uniform radial temperature profile. These conditions create an advantageous or optimal environment for the nucleation and crystallization of nanoparticles. To lock the crystallized structure and size of the particle in place, a quenching step is utilized.

The Quenching Chamber

Embodiments of the quenching chamber may have various optional features to increase the quenching rate. Increased quenching rate may be particularly important when manufacturing quantum dots which grow rapidly or when a particular size is desired, or more particularly a small size. Quenching may be increased by introducing low pressure, low temperature, or both within the quenching chamber. For example, the pressure proximate the plasma may be greater than atmospheric pressure, such as about 14 to about 20 psi. By the use of a vacuum pump, a pressure below atmospheric pressure, such as a pressure of about 1 to about 100 Torr may be used within the quenching chamber. The use of a lower pressure encourages expansion of the gas and reduce quantum dot growth. The pressure may be varied, for example, to change the rate of quenching. The pressure may be about 5 Torr, about 10 Torr, about 20 Torr, about 30 Torr, about 40 Torr, about 50 Torr, about 60 Torr, about 70 Torr, about 80 Torr, about 90 Torr, or about 100 Torr. These values may also be used to define a range, such as from about 30 Torr to about 80 Torr. Additionally, lower temperature may be provided within the quenching chamber. For example, the quenching chamber may be outfitted with an active cooling means. The quenching chamber may be provided with a cooling fluid flow, such as a flow of high pressure helium through the vessel. In an embodiment, the cooling fluid flow may be introduced into the quenching chamber from the side of the chamber opposite the plasma, such that as the particles enter the chamber from the plasma torch, a cooling flow may be directed at the particle flow from the opposing direction. Preferably, the cooling fluid flow will be arranged so that the flow is introduced uniformly with respect to the particle flow so that substantially all of the particles experience a similar cooling profile, in order to encourage more uniform growth and quenching among the population. For example, by introducing the cooling fluid opposite the plasma chamber, rather than across the quenching chamber perpendicularly to the flow, all portions of the material will interact with the cooling fluid under approximately the same conditions.

An embodiment of a quenching chamber exhibiting a cooling feature may be observed in FIG. 2, where quenching chamber 135 receives particle flow from the reaction chamber 130 portion of plasma torch 121 through perforated surface 132, which has a large number of apertures through which material may pass. Additionally, quenching chamber 135 includes manifold 137 along the side of quenching chamber 135 opposite perforated surface 132. Manifold 137 may be operated with vacuum pump 139 in order to maintain low pressure within quenching chamber 135. In order to assist in maintaining the pressure gradient, perforated surface 132 may more preferably be replaced with a series of nozzles to better separate the high and low pressure portions and permit the quantum dot material to flow into the chamber without excessive quantity of gas. Alternatively, manifold 137 may be fed a stream of cooling gas by cooling gas source 138 in order to provide a reduced temperature within quenching chamber 135. In some embodiments, not shown a piece of copper severely cooled (e.g., cooled with liquid nitrogen or liquid helium) can be used to quench the forming quantum particles. That is, the severely cooled copper plate provides a temperature differential to the nucleating/crystallizing particles passing from the plasma chamber and onto the copper plate. As a result of this extreme differential, growth of the particle is stunted and uniform quantum particles are formed.

The quenching chamber may use chemical, as well as physical (i.e., temperature, pressure, etc.) methods to achieve and encourage quenching. For example, a capping or functionalizing chemical species may be introduced into the quenching chamber so that the capping species reacts with the quantum dots so as to quench the growth of the quantum dots. In some cases, these chemical species may be introduced onto the outer surface of the quantum dot, such as organic moiety including amines, pyridines, carboxyl groups, alkyl groups, etc. Turning to FIG. 2, quenching chamber 135 also includes chemical source 136 which may supply a flow of such compounds through manifold 137 into quenching chamber 135. In other embodiments, a quenching chamber may be provided with more than one introduction point for a functionalizing species so that a series of reactions may be achieved. For example, a shell material may be introduced in one step and subsequently a functionalizing species may be introduced to form a layer of that functional moiety on the shell.

It may be appreciated that in addition to quenching growth of the quantum dot, the functional groups introduced onto the surface may additionally provide desirable functionalities to the quantum dot. The species may prevent agglomeration of the particles, may impart hydrophobicity or hydrophilicity, may provide a portion of a linkage to be subsequently attached to another particle, compound, or substrate, may add desirable electronic or optical characteristics, and so on.

These quenched nanoparticles are then transported to filter system 145 along line 140. Filter system 145 is used to collect the nanoparticles.

As discussed above, uniformity of particle size in a manufactured batch of quantum dots is desirable. Several characteristics may be used to quantify that uniformity. For example, size of the particles may be determined by direct measurement, such as using transmission electron microscopy (TEM). Alternatively, a particle size distribution may be determined indirectly. For example, methods are known for estimating the distribution based upon the characteristics of an ultraviolet-visible spectroscopy spectrum (such as by measuring the full width half max (FWHM) of a peak associated with the quantum dot).

Without wishing to be bound by theory, the present technology achieves uniformity of particle size within a manufacturing run due to uniformity and consistency provided by the novel manufacturing route. In particular, by forming and providing small (i.e., 100 micron or less), substantially uniformly sized (i.e., within 50% of a predetermined size) flow of droplets formed from a molten homogeneous material to a plasma with a uniform radial temperature profile, vaporization of the flow of droplets is both uniform and consistent. As a result, controlled cooling or quenching of a uniformly formed vapor allows for manufacture of uniformly sized quantum particles. Collection techniques may, in some embodiments, include functionalizing techniques to prevent agglomeration. Additionally or alternatively, collection techniques of the present technology can include filtering and additional processing to create tailored structures.

EXAMPLES

The following examples illustrate possible embodiments of the present technology. These examples are not limiting.

Example 1

Formation of a Zinc Oxide Quantum Dot

Using the system shown in FIG. 2, zinc oxide quantum dots are formed using the following procedure:
(1) Add solid zinc metal to body 104 of molten melt chamber 101.
(2) Purge melt chamber 101 by drawing off released contaminant gases through vent 109, and purge molten transport line 106 and reservoir 114 with an inert gas.
(3) Melt the solid zinc within molten melt chamber 101 using heating element 105 by heating to above the melting point of zinc (419.5° C.).
(4) Apply a pressure of gas from layer of pressurized gas 103 by means of gas supply 108 to force molten zinc precursor to flow through molten transport line 106.
(5) Fill reservoir 114 of droplet maker 110 with molten zinc precursor through molten transport line 106.
(6) Oscillate surface 112 at 12 kHz through the action of actuating unit 111, which may be a piezoelectric actuator, achieving a stream of droplets 119 from droplet maker 110.
(7) Establish an oxygen based plasma (e.g., oxygen, oxygen-helium, or oxygen-argon) as plasma 125 within plasma chamber 122 of plasma torch 121.
(8) Permit stream of droplets 119 to enter plasma 125.
(9) Permit the action of plasma 125 to vaporize the substantially molten zinc precursor of droplets 119.
(10) Permit quantum particle growth from the zinc precursor vapor as the vapor travels into reactor 130.
(11) Permit the forming quantum particles to enter quenching chamber 135 through perforated surface 132 (to lock in crystal structure and inhibit further growth).
(12) Subject the forming quantum particles to a flow of helium cooling gas from cooling gas source 138 through manifold 137.
(13) Permit the conditions of quenching chamber 135 to quench growth of the quantum particles.
(14) Collect quantum particles within filter system 145.

Example 2

Formation of a Tin-Silicon Quantum Dot

Using the system shown in FIG. 2 (with optional features shown in FIG. 3), tin-silicon quantum dots are formed using the following procedure:
(1) Add solid tin metal to body 104 of molten melt chamber 101.
(2) Purge melt chamber 101 by drawing off released contaminant gases through vent 109, and purge molten transport line 106 and reservoir 114 with an inert gas.
(3) Melt the solid tin within molten melt chamber 101 using heating element 105 by heating to above the melting point of tin (232° C.).
(4) Apply a pressure of gas from layer of pressurized gas 103 by means of gas supply 108 to force molten tin precursor to flow through molten transport line 106.
(5) Fill reservoir 114 of droplet maker 110 with molten tin precursor through molten transport line 106.
(6) Oscillate surface 112 at 12 kHz through the action of actuating unit 111, achieving a stream of droplets 119 from droplet maker 110.
(7) Establish an argon plasma (e.g., argon, argon/helium) as plasma 125 within plasma chamber 122 of plasma torch 121.
(8) Flow silane gas ($SiH_4$) through tube 340 into plasma chamber 122.
(9) Permit stream of droplets 119 to enter plasma 125.
(10) Permit the action of plasma 125 to vaporize the tin precursor of droplets 119.
(11) Permit quantum dot nucleation and growth from the molten tin precursor vapor and from the silane gas as the vapor travels into reactor 130.
(12) Permit the forming quantum dot to enter quenching chamber 135 through perforated surface 132.
(13) Submit the forming quantum dot to a flow of helium cooling gas from cooling gas source 138 through manifold 137.
(14) Permit the conditions of quenching chamber 135 to quench growth of the quantum dots.
(15) Collect quantum dots within filter system 145.

Example 3

Formation of a Cadmium-Telluride Quantum Dot

Using the system shown in FIG. 2 cadmium-telluride quantum dots are formed using the following procedure
(1) Add solid cadmium and tellurium metals to body 104 of molten melt chamber 101.
(2) Purge melt chamber 101 by drawing off released contaminant gases through vent 109, and purge molten transport line 106 and reservoir 114 with an inert gas.
(3) Melt the solid cadmium and tellurium metals within molten melt chamber 101 using heating element 105 by heating to above the melting point of both cadmium (321° C.) and tellurium (449.5° C.).
(4) Mix the molten cadmium and tellurium to achieve a thoroughly mixed molten mixture of cadmium and tellurium.
(5) Apply a pressure of gas from layer of pressurized gas 103 by means of gas supply 108 to force molten precursor mixture to flow through molten transport line 106.
(6) Fill reservoir 114 of droplet maker 110 with molten mixture precursor through molten transport line 106.
(7) Oscillate surface 112 at 12 kHz through the action of actuating unit 111, achieving a stream of droplets 119 from droplet maker 110.
(8) Establish an argon or argon/helium plasma as plasma 125 within plasma chamber 122 of plasma torch 121.
(9) Permit stream of droplets 119 to enter plasma 125.

(10) Permit the action of plasma 125 to vaporize the substantially molten mixture precursor of droplets 119 to form a vapor.
(11) Permit quantum dot nucleation and growth from the vapor as the vapor travels into reactor 130.
(12) Permit the forming quantum dots to enter quenching chamber 135 through perforated surface 132.
(13) Subject the forming quantum dots to a flow of helium cooling gas from cooling gas source 138 through manifold 137.
(14) Permit the conditions of quenching chamber 135 to quench growth of the quantum dots.
(15) Collect quantum dots within filter system 145.

Example 4

Formation of a Cadmium-Selenium (Core)/Zinc-Sulfide (Shell) Quantum Dot

Using the system shown in FIG. 4 cadmium-selenium/zinc-sulfide core/shell quantum dots are formed using the following procedure:
(1) Add solid cadmium and selenium to molten melt chamber 401.
(2) Purge melt chamber 401, molten transport line 406 and reservoir 414 with an inert gas.
(3) Melt the solid cadmium and selenium within molten melt chamber 401 by heating to above the melting point of both cadmium (321° C.) and selenium (220.8° C.).
(4) Mix the molten cadmium and selenium to achieve a thoroughly mixed mixture of cadmium and selenium.
(4) Provide the molten mixture to droplet maker 410.
(5) Provide a stream of droplets 436 from droplet maker 410 into plasma torch 421.
(6) Establish an argon plasma as plasma 425 in plasma torch 421.
(7) Permit the action of plasma 425 to vaporize the molten mixture precursor droplets.
(8) Permit quantum dot core growth from the molten mixture precursor vapor as the vapor travels into reactor 430.
(9) Permit the vapor to enter quenching chamber 435.
(10) Permit the conditions of quenching chamber 435 to quench growth of the quantum dot cores.
(11) Add solid zinc and sulfur to second molten melt chamber 451.
(12) Melt the solid zinc and sulfur within second molten melt chamber 451 by heating to above the melting point of both zinc (419.5° C.) and sulfur (115.2° C.).
(13) Mix the molten zinc and sulfur to achieve a thoroughly mixed mixture of zinc and sulfur.
(14) Supply the molten mixture to second droplet maker 460.
(15) Provide a stream of molten mixture droplets 461 from second droplet maker 460 into a second plasma torch 471.
(16) Establish an argon plasma as second plasma 475 within second plasma torch 471.
(17) Permit the action of second plasma 475 to vaporize the molten mixture precursor of droplets 461 of zinc and sulfur.
(18) Pass the vaporized molten mixture created in step (17) into chamber 480.
(19) Introduce the core quantum dots produced in step (10) into chamber 480 to permit a zinc sulfur shell to form over the cadmium-selenium quantum dot cores within reaction chamber 480.
(20) Permit the material to enter second quenching chamber 485.
(21) Permit the conditions of second quenching chamber 485 to quench growth of the quantum dot shells.
(22) Collect cadmium-selenium (core)/zinc-sulfur (shell) quantum dots within filter system 495.

Example 5

Formation of a Functionalized Cadmium-Telluride Quantum Dot

Using the system shown in FIG. 2 cadmium-telluride quantum dots functionalized with a carboxylic acid group are formed using the following procedure
(1) Add solid cadmium and tellurium metals to body 104 of molten melt chamber 101.
(2) Purge melt chamber 101 by drawing off released contaminant gases through vent 109, and purge molten transport line 106 and reservoir 114 with an inert gas.
(3) Melt the solid cadmium and tellurium within molten melt chamber 101 using heating element 105 by heating to above the melting point of both cadmium (321° C.) and tellurium (449.5° C.).
(3) Mix the molten cadmium and tellurium to achieve a homogeneous mixture of cadmium and tellurium.
(4) Purge melt chamber 101 by drawing off released contaminant gases through vent 109.
(5) Apply a pressure of gas from layer of pressurized gas 103 by means of gas supply 108 to force molten precursor mixture to flow through molten transport line 106.
(6) Fill reservoir 114 of droplet maker 110 with molten mixture precursor through molten transport line 106.
(7) Oscillate surface 112 at 12 kHz through the action of actuating unit 111, achieving a stream of droplets 119 from droplet maker 110.
(8) Establish an argon plasma or argon/helium plasma as plasma 125 within plasma chamber 122 of plasma torch 121.
(9) Permit stream of droplets 119 to enter plasma 125.
(10) Permit the action of plasma 125 to vaporize the molten mixture precursor of droplets 119 to form a vapor.
(11) Permit quantum dot nucleation and growth from the precursor vapor as the vapor travels into reactor 130.
(12) Permit the forming quantum dots to enter quenching chamber 135 through perforated surface 132.
(13) Subject the forming quantum dots to a gas flow including vaporized 3-mercaptopropionic acid from chemical source 136 through manifold 137.
(14) Permit the conditions of quenching chamber 135 to quench growth of the quantum dots, such that the thiol portion of the 3-mercaptopropionic acid bonds to the exterior surface of the cadmium telluride quantum dot.
(15) Collect the cadmium telluride quantum dots functionalized with a carboxylic acid group within filter system 145.

While the present disclosure has been described with reference to particular embodiments, it will be understood by those skilled in the art that various changes may be made and equivalents may be substituted for the elements thereof without departing from the scope of the disclosure. In addition, many modifications may be made to adapt the teaching of the present disclosure to particular use, application, manufacturing conditions, use conditions, composition, medium, size, and/or materials without departing from the essential scope thereof. Therefore, it is intended that the present disclosure not be limited to the particular embodiments and best modes contemplated for carrying out this disclosure as described herein. The accompanying claims are intended to cover such modifications as would fall within the true scope and spirit of the present disclosure.

What is claimed is:

1. A method of manufacturing a quantum dot having a core at least partially surrounded by a shell, the method comprising:
   melting a core precursor material to create a molten core precursor material;
   forming core precursor material droplets having controlled droplet size from the molten core precursor material;
   vaporizing the core precursor material droplets within plasma;
   forming quantum dot cores from the vaporized core precursor material droplets;
   melting a shell precursor material to create a molten shell precursor material;
   forming shell precursor material droplets of the molten shell precursor material;
   vaporizing shell precursor material droplets within plasma; and
   forming quantum dot shells on the quantum dot cores.

* * * * *